United States Patent
Brown

(10) Patent No.: US 8,539,017 B2
(45) Date of Patent: *Sep. 17, 2013

(54) SYSTEMS AND METHODS FOR CREATING NETWORK ARCHITECTURE PLANNING TOOLS

(75) Inventor: Tammy S. Brown, Littleton, CO (US)

(73) Assignee: Qwest Communications International Inc., Denver, CO (US)

(*) Notice: Subject to any disclaimer, the term of this patent is extended or adjusted under 35 U.S.C. 154(b) by 1328 days.

This patent is subject to a terminal disclaimer.

(21) Appl. No.: 12/394,893

(22) Filed: Feb. 27, 2009

(65) Prior Publication Data

US 2009/0222788 A1 Sep. 3, 2009

Related U.S. Application Data

(62) Division of application No. 10/286,258, filed on Oct. 30, 2002, now Pat. No. 7,519,709.

(60) Provisional application No. 60/379,571, filed on May 9, 2002.

(51) Int. Cl.
G06F 15/173 (2006.01)

(52) U.S. Cl.
USPC ........... 709/200; 709/206; 709/224; 709/223; 709/220; 709/221; 706/47; 717/172; 370/254

(58) Field of Classification Search
USPC .................. 709/200, 226, 223, 217, 219, 249
See application file for complete search history.

(56) References Cited

U.S. PATENT DOCUMENTS

| | | | |
|---|---|---|---|
| 5,270,919 A | 12/1993 | Blake et al. | |
| 5,680,325 A | 10/1997 | Rohner | |
| 5,687,315 A | 11/1997 | Tezuka et al. | |
| 5,715,432 A | 2/1998 | Xu et al. | |
| 5,793,964 A | 8/1998 | Rogers et al. | |
| 5,821,937 A | 10/1998 | Tonelli et al. | |
| 5,831,610 A | 11/1998 | Tonelli et al. | |
| 5,974,127 A | 10/1999 | Wernli et al. | |
| 6,018,769 A | 1/2000 | Tezuka et al. | |
| 6,229,540 B1 | 5/2001 | Tonelli et al. | |
| 6,381,644 B2 | 4/2002 | Munguia et al. | |
| 6,418,123 B1 | 7/2002 | Kawakami et al. | |
| 6,438,219 B1 | 8/2002 | Karau et al. | |

(Continued)

OTHER PUBLICATIONS

U.S. Appl. No. 10/286,230, Office Action dated Aug. 13, 2007, 8 pages.

(Continued)

Primary Examiner — Jude Jean Gilles
(74) Attorney, Agent, or Firm — Swanson & Bratschun, L.L.C.

(57) ABSTRACT

A method of creating a network architecture planning tool includes receiving at a host computer system a request from a user computer to display a first object template, transmitting an electronic file comprising the object template to a user computer, receiving at the host computer system information defining a first object comprising at least a function defining a next object, receiving at the host computer system a request from a user computer to display at least a second object template, transmitting an electronic file comprising the at least a second object template to the user computer, receiving at the host computer system information defining at least a second object relating to a network, and storing the information defining the first object and the information defining at least the second object.

15 Claims, 6 Drawing Sheets

(56) References Cited

U.S. PATENT DOCUMENTS

| | | | |
|---|---|---|---|
| 6,529,948 B1 | 3/2003 | Bowman-Amuah | |
| 6,535,227 B1 | 3/2003 | Fox et al. | |
| 6,604,135 B1 | 8/2003 | Rogers et al. | |
| 6,611,862 B2 | 8/2003 | Reisman | |
| 6,611,867 B1 | 8/2003 | Bowman-Amuah | |
| 6,615,253 B1 | 9/2003 | Bowman-Amuah | |
| 6,658,464 B2 | 12/2003 | Reisman | |
| 6,704,396 B2 | 3/2004 | Parolkar et al. | |
| 6,711,137 B1 | 3/2004 | Klassen et al. | |
| 6,839,747 B1 | 1/2005 | Blumenau et al. | |
| 6,917,816 B2 | 7/2005 | Abed et al. | |
| 7,054,924 B1* | 5/2006 | Harvey et al. | 709/220 |
| 7,103,001 B1* | 9/2006 | Cordsmeyer et al. | 370/241 |
| 7,225,249 B1 | 5/2007 | Barry et al. | |
| 7,330,722 B1* | 2/2008 | Kirtley et al. | 455/423 |
| 7,519,709 B2 | 4/2009 | Brown | |
| 8,335,839 B2 | 12/2012 | Brown | |
| 2001/0052003 A1 | 12/2001 | Seki et al. | |
| 2001/0052013 A1 | 12/2001 | Munguia et al. | |
| 2002/0042846 A1 | 4/2002 | Bottan et al. | |
| 2002/0082850 A1 | 6/2002 | Panelli | |
| 2002/0087370 A1 | 7/2002 | Brueckheimer et al. | |
| 2002/0129094 A1 | 9/2002 | Reisman | |
| 2002/0161903 A1* | 10/2002 | Besaw | 709/229 |
| 2002/0188486 A1 | 12/2002 | Gil et al. | |
| 2002/0188513 A1 | 12/2002 | Gil et al. | |
| 2003/0028624 A1 | 2/2003 | Hasan et al. | |
| 2003/0033161 A1 | 2/2003 | Walker et al. | |
| 2003/0033353 A1 | 2/2003 | Simpson et al. | |
| 2003/0101153 A1 | 5/2003 | Francis et al. | |
| 2003/0120768 A1 | 6/2003 | Simpson | |
| 2003/0135543 A1 | 7/2003 | Kittredge et al. | |
| 2003/0158765 A1 | 8/2003 | Ngi et al. | |
| 2003/0172141 A1 | 9/2003 | Miller, II et al. | |
| 2004/0215722 A1 | 10/2004 | Mukherjee | |

OTHER PUBLICATIONS

U.S. Appl. No. 10/286,230, Pre-Appeal Decision dated Dec. 20, 2007, 2 pages.
U.S. Appl. No. 10/286,230, Advisory Action dated Mar. 3, 2009, 12 pages.
U.S. Appl. No. 10/286,230, Notice of Allowance dated Jun. 26, 2009, 4 pages.
U.S. Appl. No. 10/286,233, Notice of Appeal dated Oct. 22, 2007, 3 pages.
U.S. Appl. No. 10/286,258, Notice of Allowance dated Dec. 31, 2008, 9 pages.
U.S. Appl. No. 10/286,258, Issue Notification dated Mar. 25, 2009, 1 page.
U.S. Appl. No. 10/286,233, Decision on Appeal dated Oct. 27, 2010, 6 page.
Software Design, from Wikipedia, the Free encyclopedia, obtained on Apr. 18, 2012; 1 page.
U.S. Appl. No. 10/286,233; Non-Final Rejection dated Apr. 30, 2012; 19 pages.
U.S. Appl. No. 10/286,233; Issue Notification dated Nov. 28, 2012; 1 page.
U.S. Appl. No. 10/286,233; Notice of Allowance dated Sep. 18, 2012: 25 pages.
U.S. Appl. No. 10/286,230, Office Action dated Feb. 9, 2006, 6 pgs.
U.S. Appl. No. 10/286,230, Office Action dated Aug. 24, 2006, 8 pgs.
U.S. Appl. No. 10/286,230, Office Action dated Dec. 21, 2006, 2 pgs.
U.S. Appl. No. 10/286,230, Office Action dated Mar. 16, 2007, 6 pgs.
U.S. Appl. No. 10/286,230, Office Action dated Feb. 13, 2008, 7 pgs.
U.S. Appl. No. 10/286,230, Pre-Appeal Brief dated Nov. 12, 2007, 3 pgs.
U.S. Appl. No. 10/286,230, Office Action dated Sep. 19, 2008, 9 pgs.
U.S. Appl. No. 10/286,230, Advisory Action dated Dec. 17, 2008, 1 pgs.
U.S. Appl. No. 10/286,230, Office Action dated Mar. 3, 2009, 10 pgs.
U.S. Appl. No. 10/286,233, Office Action dated Feb. 7, 2006, 9 pgs.
U.S. Appl. No. 10/286,233, Office Action dated Aug. 8, 2009, 13 pgs.
U.S. Appl. No. 10/286,233, Office Action dated Oct. 23, 2006, 13 pgs.
U.S. Appl. No. 10/286,233, Office Action dated Feb. 8, 2007, 11 pgs.
U.S. Appl. No. 10/286,233, Office Action dated Jun. 27, 2007, 10 pgs.
U.S. Appl. No. 10/286,233, Advisory Action dated Aug. 29, 2007, 2 pgs.
U.S. Appl. No. 10/286,233, Notice of Panel Decision dated Nov. 15, 2007, 1 pgs.
U.S. Appl. No. 10/286,233, Appellant's Brief dated Nov. 30, 2007, 18 pgs.
U.S. Appl. No. 10/286,233, Notice dated Apr. 8, 2008, 2 pgs.
U.S. Appl. No. 10/286,233, Revised Appellant's Brief dated May 8, 2008, 21 pgs.
U.S. Appl. No. 10/286,233, Examiner's Answer dated Aug. 13, 2008, 10 pgs.
U.S. Appl. No. 10/286,233, Appellant's Reply Brief dated Oct. 10, 2008, 11 pgs.
U.S. Appl. No. 10/286,233, Office Communication dated Jan. 5, 2009, 1 pgs.
U.S. Appl. No. 10/286,258, Office Action dated Mar. 21 2006, 4 pgs.
U.S. Appl. No. 10/286,258, Office Action dated Jul. 18 2006, 10 pgs.
U.S. Appl. No. 10/286,258, Office Action dated Apr. 3 2007, 12 pgs.
U.S. Appl. No. 10/286,258, Office Action dated Jun. 20, 2007, 4 pgs.
U.S. Appl. No. 10/286,258, Pre-Appeal Brief dated Jul. 3, 2007, 3 pgs.
U.S. Appl. No. 10/286,258, Notice of Panel Decision dated Sep. 25, 2007, 1 pgs.
U.S. Appl. No. 10/286,258, Office Action dated Mar. 18, 2008, 14 pgs.
U.S. Appl. No. 10/286,258, Office Action dated Oct. 16, 2008, 15 pgs.

* cited by examiner

BACK TO Q&A

AMC Tracking ID Information

| | |
|---|---|
| AMC Tracking ID: | 2O1LF00014 |
| Data Created: | 05/29/2002 |
| Job Creator: | txbrow2 |
| Description: | TEST |
| Initiator Type: | O |
| Company Code: | L |
| State: | 1 |

602

Scenario ID Information

| | |
|---|---|
| Architecture Solution: | DS-3 Service Request |
| Date Created: | 06/13/2002 |
| Scenario ID: | 289 |
| Scenario Creator: | txbrow2 |
| Scenario Description: | TEST DEMO |

604

Question/Answer Results: 600

606

| QUESTIONS | ANSWERS | DATE | CUID |
|---|---|---|---|
| Is there an Existing Mux with Spare Capacity at the Customer Premises? | No | 06/13/2002 | txbrow2 |
| Is this a New or Existing Building that meets FTTB Criteria? | Does Not Meet FTTB Criteria | 06/13/2002 | txbrow2 |
| Select Multiplexer System Type: | Ring Add/Drop | 06/13/2002 | txbrow2 |
| Is Fiber Distance Greater than 105Kft (20 Miles)? | No | 06/13/2002 | txbrow2 |
| Starting Fiber Cable Questions. (This section is for a Single Business Building Location Only.) | OK | 06/13/2002 | txbrow2 |
| Available (4) Spares Fiber to DA? | Yes | 06/13/2002 | txbrow2 |
| Input the distance of Fiber cable needed to be placed to reach the Building Terminal Room. | 123 | 06/13/2002 | txbrow2 |
| Input footage distance of conduit needed. | 213 | 06/13/2002 | txbrow2 |
| Planners will Need to Determine Conduit Method of Placement and Add Additional Costs into CPD. | OK | 06/13/2002 | txbrow2 |

FIG. 6A

| | | | |
|---|---|---|---|
| Input footage distance of Innerduct needed. (C-STRCTR-INTRDUCT-UG) | 321 | 06/13/2002 | txbrow2 |
| Central Office Wire Center Type (Refer to Help File Below): | Nortel | 06/13/2002 | txbrow2 |
| The following Forecast input requests are for a Single Building Location Only. | OK | 06/13/2002 | txbrow2 |
| Enter DS1 Three (3) Year Forecast: | 28 | 06/13/2002 | txbrow2 |
| Enter SHARP DS1 Three (3) Year Forecast: | 0 | 06/13/2002 | txbrow2 |
| Enter SHARP PLUS DS1 Three (3) Year Forecast: | 0 | 06/13/2002 | txbrow2 |
| Enter DS3 Three (3) Year Forecast: | 1 | 06/13/2002 | txbrow2 |
| Enter SHARP DS3 Three (3) Year Forecast: | 0 | 06/13/2002 | txbrow2 |
| Enter SHARP PLUS DS3 Three (3) Year Forecast: | 0 | 06/13/2002 | txbrow2 |
| Enter STS1 Three (3) Year Forecast: | 1 | 06/13/2002 | txbrow2 |
| Enter OC3/OC3C Three (3) Year Forecast: | 1 | 06/13/2002 | txbrow2 |
| Select Type of OC3 Drop: | Protected | 06/13/2002 | txbrow2 |
| Enter OC12/OC12C Three (3) Year Forecast: | 0 | 06/13/2002 | txbrow2 |
| Matrix Value Results | Nortel HX-3400 Dual Shelf | 06/13/2002 | txbrow2 |
| Starting Customer Premises Nortel OC3 HX-3400 Requirements. | OK | 06/13/2002 | txbrow2 |

Configurations Generated:

608

| QTY | CONFIGURATION PACKAGE | FRC |
|---|---|---|
| | Config Packages for Group - OSP Fiber | |
| 321 | C-ACTVTY-CONDUIT-INRDCT-AP_3-UG | 4C |
| 123 | C-ACTVTY-CONDUIT-PUL-FBR-UG | 4C |
| 213 | C-STRCTR-CONDUIT-4_PVC_C-2DUCT | 4C |
| 321 | C-STRCTR-INRDUCT-UG | 4C |
| 123 | C-FIBER-UGEXCH-024 | 4C |

BACK TO Q&A

FIG. 6B

SYSTEMS AND METHODS FOR CREATING NETWORK ARCHITECTURE PLANNING TOOLS

CROSS-REFERENCES TO RELATED APPLICATIONS

This application is a divisional of U.S. patent application Ser. No. 10/286,258, entitled "SYSTEMS AND METHODS FOR CREATING NETWORK ARCHITECTURE PLANNING TOOLS" and filed on Oct. 30, 2002, which claims priority benefit of U.S. Provisional Patent Application Ser. No. 60/379,571, entitled "SYSTEMS AND METHODS FOR CREATING NETWORK PLANNING ARCHITECTURES, LABELS AND CONFIGURATIONS" and filed on May 9, 2002, and which applications are incorporated herein by reference in its entirety for all purposes.

This application is related to commonly assigned U.S. patent application Ser. No. 10/286,233, entitled "SYSTEMS AND METHODS FOR USING NETWORK ARCHITECTURE PLANNING TOOLS" and filed on Oct. 30, 2002, and to commonly assigned U.S. patent application Ser. No. 10/286,230, entitled "SYSTEMS AND METHODS FOR ARCHIVING NETWORK PLANNING PROCESSES" and filed on Oct. 30, 2002, and which applications are incorporated herein by reference in their entirety for all purposes.

BACKGROUND OF THE INVENTION

Many businesses and organizations require or desire standardization with respect to their products and/or services. The need or desire for standardization may be driven by, for example, a business model embodied in a corporation's strategy or policy, contracts or agreements with government entities or other businesses, laws relating to the business, and the like. For example, in the telecommunication industry the Regional Bell Operating Companies (RBOCs) share responsibility for maintaining and expanding the public switched telephone network (PSTN). In order to ensure that a new phone installed in a home in Bangor, Me. functions properly when placing a call to a 30-year-old phone in Los Angeles, Calif., the phone and any switching locations servicing the phone must be installed according to network-wide standards. Further, laws such as the Telecommunications Act of 1996 require a certain degree of network standardization so that Competitive Local Exchange Carriers (CLECs) are able to use and maintain the network infrastructure installed by the RBOCs. However, a number of factors may complicate efforts to achieve standardization.

Once again using the example of the telecommunications industry, the shear size of the PSTN, the number of different possible installations, and the myriad factors that drive the need for standardization, produce literally millions of permutations for a telephone or central office installation. Add to this the number of different telecommunication equipment manufacturers competing to provide hardware, and the problem of maintaining standardization becomes seemingly unmanageable.

In the past, some companies have relied on flow charts to attempt to guide designers. The flowcharts may have been created by business policy implementers based on changes or additions to the businesses policy, new laws affecting the company's business, and/or the like. However, traditional flowcharts have numerous limitations. For example, a complex flowchart may guide the user through several branching points, each having multiple options, with no safeguard to ensure the user returns to complete all paths from the branching points. Further, traditional flowcharts do not necessarily record the decision process that results in a particular solution, a feature that would be beneficial to businesses that may be called to demonstrate compliance with laws or regulations.

Thus, for the foregoing reasons, a decision tool is needed that incorporates evolving requirements, standardizes a business' products and/or services, and records the steps in a decision process, among other things.

BRIEF SUMMARY OF THE INVENTION

Embodiments of the present invention thus provide a method of creating a network architecture planning tool. The method includes receiving at a host computer system a request from a user computer to display a first object template, transmitting an electronic file comprising the object template to a user computer, receiving at the host computer system information defining a first object comprising at least a function defining a next object, receiving at the host computer system a request from a user computer to display at least a second object template, transmitting an electronic file comprising the at least a second object template to the user computer, receiving at the host computer system information defining at least a second object relating to a network, and storing the information defining the first object and the information defining at least the second object. In some embodiments, the network relates to a portion of the public switched telephone network. The method may include validating the information defining the first object. The information defining at least the second object may include at least one configuration item related to the network. The information defining at least the second object may include an action to take related to a network architecture. The action may include contacting an individual for information relating to the network architecture, obtaining educational information relating to the network architecture, and/or completing a form relating to the network architecture. The educational information may be located on a web site and the information defining the second object may include a URL for the web site.

In other embodiments, a method of creating a planning tool includes determining a sequence of steps in a planning process, associating at least one object with each step in the planning process, and linking the objects according to the sequence. Each object may include an operation and the operation may depend on a location of the step associated with the object in the sequence of steps. The step of associating at least one object with each step in the planning process may include receiving at a user computer a list of objects from a host computer system and selecting at least one of the objects from the list to associate with a step. The step of associating at least one object with each step in the planning process comprises entering information defining a first object comprising at least a function defining a next object and entering information defining at least a second object relating to a network. The step of associating at least one object with each step in the planning process may include receiving at a user computer a list of object templates from a host computer system, selecting an object template from a list of object templates, entering information defining an object, and transmitting the information defining the object to the host computer system. The step of linking the objects according to the sequence may include identifying at least one next object, defining a condition for each of the at least one next objects, and transmitting information relating to the at least one next object and the conditions to a host computer system. Determining a sequence of steps in a planning process may include assimilating requirements from a plurality of requirements sources, identifying parameters relating to projects that determine applicable ones of the requirements, creating at least one step for each parameter that acquires information relating to the parameter, ordering the steps such to acquire parameter information according to a particular sequence. The requirements sources may include a corporate policy, a supplier agreement and/or a government regulation.

In yet other embodiments, a method of creating a planning too includes receiving at a host computer system a request to display a list of objects, transmitting an electronic file comprising the list to a user computer, receiving at the host computer system a selection of a first object, receiving at the host computer a selection of at least a second object, receiving at the host computer at least one link that associates the first object with the at least a second object, and storing the first object, the at least a second object, and the at least one link.

In still other embodiments, a system for creating network architecture planning tools includes a host computer system and a network communicably coupling the host computer system to at least one user computer. The host computer system may be programmed to receiving a request from the user computer to display a first object template, transmit an electronic file comprising the object template to the user computer, receive information defining a first object, receive a request from the user computer to display at least a second object template, transmit an electronic file comprising the at least a second object template to the user computer, receive information defining at least a second object, and store the information defining the first object and the information defining at least the second object. The information defining the first object may include a function defining a next object and the information defining at least a second object may relate to a network.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIGS. 6A-B illustrate a response list and a configuration list according to one embodiment of the present invention.

DETAILED DESCRIPTION OF THE INVENTION

Figure 1:
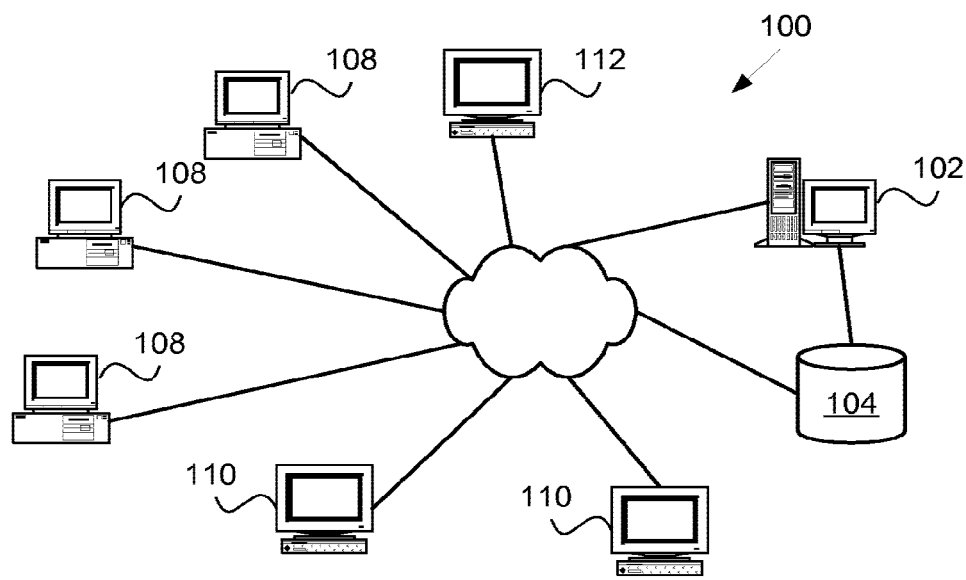
FIG. 1 illustrates a system for network architecture planning according to embodiments.

The present invention provides a configurable planning tool. The tool and the method for using it may be applied in a wide variety of planning environments, particularly those that require standardization and the integration of planning requirements from multiple sources. However, the present invention is not limited to these types of environments.

By way of example and not limitation, the present invention will be described herein primarily as a network planning tool in the telecommunications industry. However, a multitude of other uses will become apparent to those skilled in the art in light of the disclosure here. Thus, the present invention is not limited to planning tools for either networks or the telecommunication industry.

The PSTN comprises numerous building blocks that may be analyzed on several different levels. For example, at one level, the PSTN includes building blocks such as central offices (COs), residential installations, business installations, and the like. However, at a lower level, the PSTN includes routers, multiplexers, demultiplexers, relays, switches, and the like. At an even lower level, the PSTN includes racks, power supplies, copper cable, fiber optic cable, and the like. Thus, like most any product—or service—the PSTN may be divided into smaller, standard components, that may be combined in multiple different ways to produce many unique versions of the end item.

In this example of the present invention relating to the telecommunication industry, the PSTN will be considered at three levels: architectures, models, and configurations. Architectures are the starting point for network planners and engineers. Examples of architectures include residential telephone installations, business T-1 installations, COs, and the like. Thus, prior to adding an item to the PSTN, a network planner or engineer would decide which architecture is applicable to the new item.

Architectures are made up of models. Once a planner determines the appropriate architecture, different models may be required depending upon the specific parameters of the architecture. For example, a residential telephone installation architecture may be for a single family residence, a four-unit town home, or a 150 unit high rise apartment complex. The single family residence might require only a single terminal, while the apartment complex might require a switching panel, multiplexers, demultiplexers, and numerous terminals. Thus, depending upon the size and complexity of an architecture, several different models or possibly only a single model may be required.

Configurations are the building blocks of models. Configurations may be considered ordering units, individual components that may be enumerated on an order form, bill of materials, or equipment schedule. In theory, a network planner should be able to present a technician with a list of configurations that the technician then may use to complete an installation. However, heretofore, the planning process lacked sufficient rigor to function this simply in practice.

Previous attempts to accomplish network planning using architectures, models and configurations fell short of optimal. Such attempts included the use of flow charts at the architecture and model levels to guide the user to the necessary configurations. For example, the user would select an architecture flowchart, depending upon the type of installation being planned. The flowchart may have been available electronically or in paper form. However, being a mere two dimensional representation of a planning process, a flowchart suffered from a number of inherent limitations.

First, complex network planning flowcharts often have numerous points with multiple options. When completing a flow chart manually, the flowchart may not force the user back to complete all possible options. Thus, critical network configurations may be overlooked.

Second, flowcharts are not easily updated. In the network planning environment, design requirements change often. As will be described, requirements that drive network configurations originate from many sources and are subject to change. However, changing the paths through a flowchart as a result of a requirements change may require substantial effort.

Third, even though the process of completing a flowchart may produce an accurate configuration list, the decisioning process that resulted in the list is not saved for future reference. For example, if a parameter changes (e.g., the number of telephones to be installed in a business) that affects the configurations, a network planner may need to repeat the entire flowchart to see how the change affects the specific configurations needed. This can be a laborious task in many cases. Even more importantly, however, because compliance with some requirements is subject to government regulation, documentation of a decisioning process may be required to demonstrate that compliance. Manual flowcharts do not result in such documentation. Thus, for these reasons, prior solutions fell short of providing the benefits of the present invention, as will become apparent.

As stated previously, PSTN network requirements derive from many sources. First, standard engineering drives the need for some configurations. However, other requirements sources may be more dynamic. For example, a corporation's policy may drive configurations. A telecommunications company may adopt a policy relating to planing for future growth that all non-residential installations must be sized for 150% of current projections. Thus, each installation must account for this policy in the decisioning process. If this policy later changes, the changes must be implemented. As another example, a corporation may negotiate agreements with suppliers that drive configurations. Agreements to purchase in quantities at a discounted rate, for example, must be included in decisioning processes. Further, standards required by law may drive specific PSTN installations. As these standards change, so must the planning tools used to implement them. The present invention satisfies these and many other objectives.

The present invention may be embodied in a number of different arrangements, one of which is illustrated in FIG. 1. The planning system 100 of FIG. 1 should not be considered limiting; many other possible arrangements are apparent to those skilled in the art in light of this disclosure, all of which are considered to be within the scope of the present invention. The planning system 100 includes a host computer system 102. The host computer system 102 may be, for example, a server computer, a personal computer, a workstation, or other suitable computing device. The host computer system 102 includes application software that programs the host computer system 102 to perform one or more methods according to the present invention. For example, application software resident on the host computer system 102 may program the host computer system 102 to act as a web site server.

The host computer system 102 may comprise a single computing device, that includes data storage. However, in other embodiments, the host computer system 102 may comprise several computing devices and data storage arrangements that cooperate to perform the functions of the host computer system 102. For example, the host computer system 102 may include a web site server, an email server, a mass storage arrangement, a security server, and the like. In this example of the present invention, a planning database 104 is illustrated as being separate from the host computer system 102; however, the two may be integral with each other. In some embodiments, the planning database 104 is co-located with the host computer system, while in other embodiments, the two communicate through a network, such as the network 106.

The system 100 also includes a network 106. The network 106 may be the Internet, an intranet, a wide area network (WAN), a local area network (LAN), a virtual private network, any combination of the foregoing, or the like. Through the network 106, user computers 108 may access the host computer system 102 and the planning database 104.

The user computers 108 are the tools through which network planners and engineers interact with the present invention to plan network projects. The user computers 108 may be most any computing device such as a personal computer, or the like. For instance, the user computers may be desktop PCs, laptop PCs, server computers, and/or workstations. In some embodiments, one or more user computers may be personal digital assistants (PDAs) or the like. The user computers 108 may access the network 106, and thus the host computer system 102 and the planning database 104, through wireless or wired connections.

The planning system 100 also includes one or more architecture manager computers 110. The architecture manager computers 110 may be any of the computing devices discussed with respect to the user computers 108, and may access the network 106 through wired or wireless connections. The architecture manager computers 110 are tools through which architecture managers implement planning tools for new architectures, models, and configurations. Thus, architecture managers perform the "authoring" function of the present invention, as will be described in more detail hereinafter.

The planning system 100 also includes at least one administration computer 112. The administration computer 112 is the tool through which a system administrator accesses the host computer system 102 and the planning database 104. System administrators write, compile, and execute the software that performs the functions of the present invention. System administrators also perform many other system administration functions such as server maintenance, user enrollment and access termination, software updates, and the like.

In some embodiments, any particular computer may function as an architecture manager computer 110, administration computer 112, or user computer 108. Security systems, however, may limit access to particular functions such that users of one class cannot access functions of other classes.

Many other components may be present in the planning system 100 of the present invention. Further, all possible embodiments of the present invention do not necessarily include the components discussed herein. For example, in some embodiments, the various components may be integrated into a single workstation or other computing device. Many other variations are apparent to those skilled in the art in light of this disclosure. Thus, the present invention is not limited to this example of a planning system 100.

Figure 2:
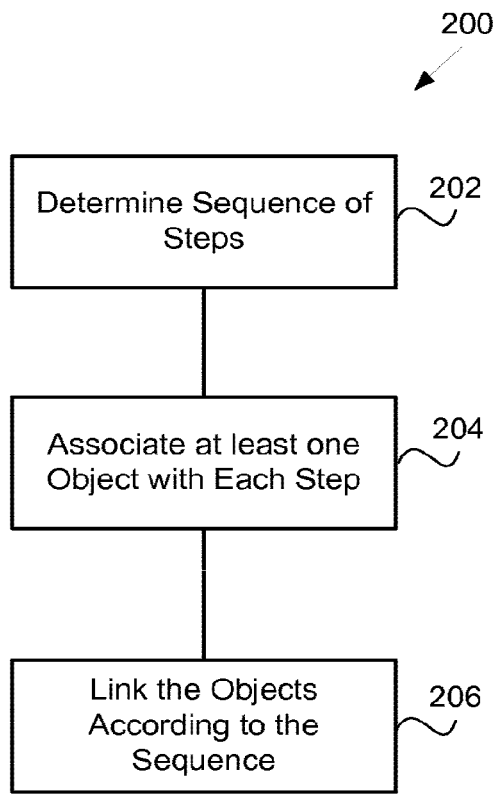
FIG. 2 is a flowchart illustrating a method of creating a planning tool according to embodiments of the present invention.

Attention is now directed to FIG. 2, which illustrates a method 200 of authoring a planning tool according to the present invention. The method 200 may be used to author network planning tools. For example, the method 200 may be used by architecture managers to author tools for architectures, models, and configurations.

The method begins at operation 202, determining a sequence of steps in the planning process. At this operation, an author, such as an architecture manager, who is responsible for a particular type of installation integrates the requirements for the installation. This may include compiling requirements from corporate policies, supplier agreements, industry standards, manufacturer requirements, and the like. The operation also includes identifying the possible variables that may affect the configurations needed for any particular installation. For example, the variables for a business telephone installation may include: the number of telephones and fax machines to be installed; the customer premises equipment to which the installation will interface; the distance to the nearest central office; the type of wire servicing the installation; the existing capacity of the wire; the location of the installation relative to the wire service panel; and the like. These and many other variables may affect the configurations needed to support any particular installation.

Operation 202 also includes determining a logical sequence that should be used to gather information relating to the variables. For example, the type of wire servicing the installation (e.g., copper or fiber) makes a significant difference in the configurations needed for the installation. Thus, it may be advantageous to identify this variable early in the process. In fact, an author may wish to use this question to drive a user from a particular architecture tool to a model tool.

As explained previously, models are building blocks for architectures, and configurations are the building blocks for models. Part of the authoring process is determining the appropriate level for segmenting architectures into models. In some embodiments, it is advantageous to segment architectures into modules at points where equipment (i.e., configurations) is most significantly affected. In the case of network planning tools, whether an installation is serviced by copper wire or fiber optic cable is such a significant point. Thus, in the present example, one of the early steps in the planning process at the architecture level may be "Determine type of wire servicing the installation." The response by a user to this step during an actual planning session may lead the user to different model tools.

Operation 202 continues until all possible variables affecting configurations needed in an installation are accounted for and reduced to steps in a particular sequence. Operation 202 may be compared to a systems engineering process wherein the design for a complex system is recursively analyzed with each recursion focusing on a lower level of detail than the previous recursion. To with, the sequence of steps may be subdivided into one or more architecture tools, each leading to a number of model tools. In some embodiments, model tools may be shared with architectures relating to different type of installations. For example, a module relating to sizing a demultiplexer and selecting the necessary configurations may be used both for a business telephone installation, and a residential telephone installation, such as for an apartment complex. Other examples are possible. In some embodiments, a user may be allowed to select among different models that each could satisfy the requirements of the installation. For example, one model may relate to an installation using equipment from manufacturer A, while a second module relates to an installation using equipment from Manufacturer B.

Once the sequence of steps is determined, at step 204 at least one object is selected to associate with each step. Objects are program elements used to construct planning tools. As will be explained in more detail hereinafter, objects may display a question, perform a calculation, provide information, and the like. Objects may be context sensitive. For example, an object that requests a response to a question may have different possible answers depending upon where the step associated with the object appears in the sequence of steps and what responses preceded the object. Ultimately, objects identify one or more configurations needed for an installation.

Objects may be selected from a library of objects, or objects may be customized for a particular architecture or model tool. Ideally, any particular object is used in numerous tools, thus reducing the number of unique objects required in the planning system.

At operation 206, the author links the objects according to the sequence. Links may be conditional, thus linking to different objects depending upon the condition. In some embodiments, the links also are objects.

The objects and links are stored in a database or other storage arrangement suitable for the specific embodiment. For example, in some embodiments, objects and links are data elements in a database program such as Microsoft Access. What results is an end-to-end planning tool that leads a user through a sequence of steps that results in a configuration list for a particular installation. The use of such a tool will be explained in more detail below, as will one specific embodiment of an authoring tool.

A planning tool according to the present invention has a number of advantages. First, if properly designed, the architecture or model tool forces the user to follow all paths relevant to the particular installation. Unlike the case with manual flowcharts, it is difficult for the user to omit steps or sequences. Further, the tool may be easily modified without changing the entire tool. If new requirements become necessary to implement, the author is able to modify only the objects affected by the new requirements, while the remainder of the tool remains intact. Further still, as will be explained, a user's path through a planning process may be saved for future reference or modification. If compliance with a mandated decision process is required, the path may be presented for inspection. Additionally, if installation parameters change and result in a change to the decision process, the path may be updated to reflect the change without needing to re-accomplish the entire process through the tool. In some embodiments, if a revised parameter alters the decision path, the tool may determine the resulting alternative path together with a revised configuration list. If the new path leads to objects not encountered during the original decision process, thus resulting in parameters to enter, then the tool may complete the decision process up to the point that the new path diverges from the prior path. The user then may complete the remainder of the decision process.

Figure 3:
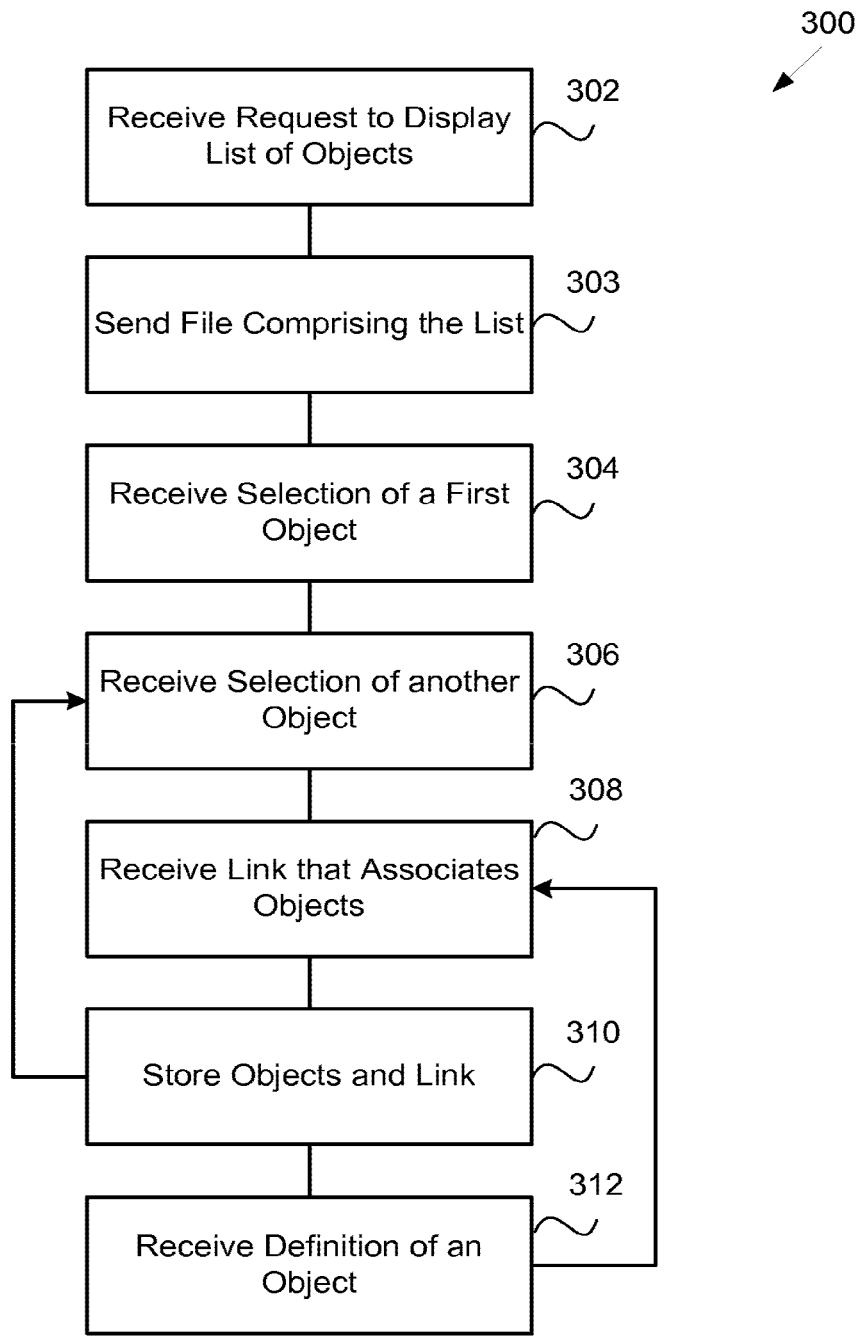
FIG. 3 is a flowchart illustrating a method of creating a planning tool according to embodiments of the present invention.

Attention is directed to FIG. 3, which illustrates a method 300 of creating a network planning tool using a host computer system. The host computer system in this method may be the host computer system 102 of FIG. 1, which receives information from and transmits information to one or more user computers 108 and/or architecture manager computers 110. In the case of the method 300 of creating a network planning tool, the host computer system interacts with an architecture manager computer. The method 300 begins at operation 302 when the host computer system receives a request to display a list of objects. The request may take many forms. The request may be for only objects related to particular types of architectures or models. Alternatively, the request may be for only objects of a particular type, such as questions, calculations, information, or the like. The request may be generated when a user (e.g., an architecture manager, in the present example) selects a hyperlink on a web page. A specific example of the present invention embodied in an HTML environment employing hyperlinks and the like will be explained in more detail hereinafter.

At operation 303, the host computer system selects objects relating to the request from a library of objects and sends the list to the requesting computer. In some embodiments no library exists or exists only after a user creates the objects. If a library exists and a list of objects is transmitted at operation 303, the host computer system may receive a selection of an object at operation 304.

At operation 306, the host computer system receives a selection for another object. Operation 306 may be preceded by a second request, similar to the request at operation 302, to receive a list of objects in the library or a list of objects meeting certain criteria. At operation 308, the host computer receives a link that associates the first object with another object. The link may include criteria that makes the link conditional. For example, in the case of a conditional link having two possible outcomes such as "true" and "false," the link may associate the first object with a second object upon the occurrence of a "true" condition, and associate the first object with a third object upon the occurrence of a "false" condition. The condition may be based on responses obtained in response to questions in previous objects. Many other conditional situations are possible.

Objects also may result in the identification of a configuration. In fact, in network architecture planning applications, the intent of the planning process is to create a list of all configurations needed for an installation. Thus, the linking of objects typically leads to an object that causes a configuration to be added to a configuration list, although this is not always the case. Terminal objects may lead to other actions. For example, a terminal object may instruct the user to complete a form, contact an individual for instructions or to provide information, seek information from an educational resource such as a web site, and the like. Many other examples are possible.

At operation 310, the host computer system stores the objects and the link associating the objects. As mentioned previously, the objects and links may be data elements in a typical database application. However, many other software applications may be used, as is apparent to those skilled in the art.

In some embodiments, the process of receiving objects and receiving links associating objects continues until the entire planning process is reduced to data. Thus, operation 310 may branch back to operation 306 as shown. However, it also may be the case that no objects exist in a library or an object is needed that is not available in a library. In this case, a new object may be created at operation 312.

Operation 312 may include receiving a request at the host computer to transmit an object template. Every object can be classified into a discrete set of object types. Thus, some embodiments of the present invention include object templates to aid in the creation of new objects. Object templates will be explained in more detail hereinafter with reference to a specific embodiment of the present invention.

Operation 312 also includes receiving the attributes that define an object. As mentioned previously, an object may ask a question, perform a calculation, transmit information, list a configuration, link to another object, and the like. Thus, the particular attributes of an object are defined at operation 312. Attributes may include the question, the potential response, the formula for a calculation, a conditional expression, actions to take based on the conditions, and the like. For example, in the network architecture planning process, an object may ask the distance from an equipment rack to a switching panel. If the distance is greater than a predetermined distance (25 feet, for example), an additional configuration, such as a repeater or signal booster, may be required in the final list of configurations.

After an object definition is received at operation 312, the method may proceed to operation 308 where a link associating the newly-defined object with a previously-identified object is received. The method may continue as shown until the entire planning process for a particular architecture is reduced to data.

Figure 5:
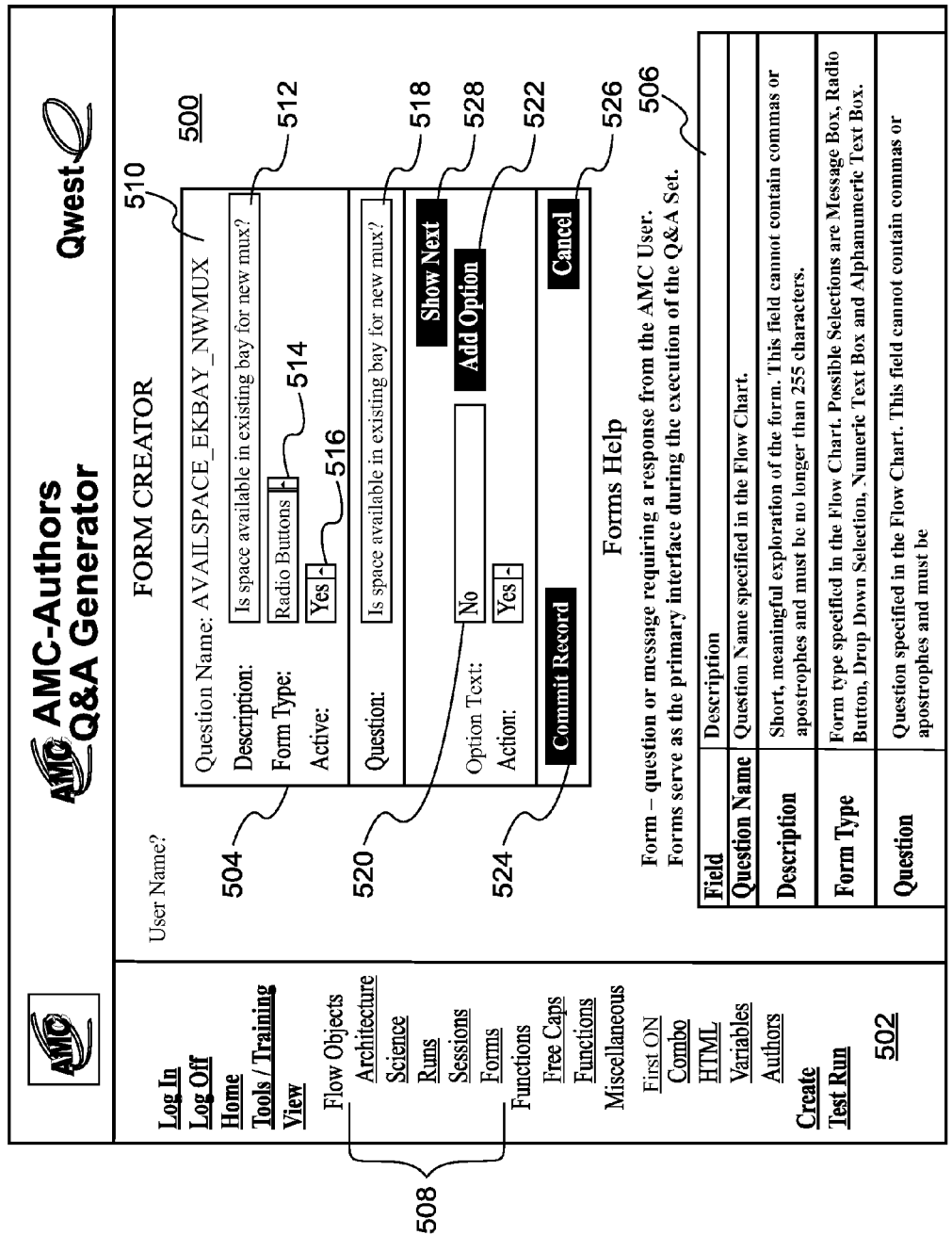
FIG. 5 illustrates an object template according to one specific embodiment of the present invention.

Attention is directed to FIG. 5 which depicts a display screen illustrating an exemplary object template according to one specific embodiment of the present invention. For example, FIG. 5 illustrates an HTML page, presented in a well-known web browser environment, according to an embodiment of the present invention. The display screen 500 is a form object template. The form object, in this embodiment of the present invention, asks a question the relates to a parameter for the installation being planned. The display screen includes a navigation area 502, a template area 504, and a help area 506. The navigation area 502 includes a number of hyperlinks 508 for navigating to different display screens in the authoring tool. The help area 506 includes brief descriptions of the fields to be completed in the template area 504. The template area 504 includes a number of fields and buttons that define the object as will be described.

In the template area 504 of the form template display screen 500, a question name 510 identifies the object. As stated previously, objects may be used multiple times within a planning tool or may be used in different planning tools. Thus, the question name 510 serves to uniquely identify the object. The description field 512 provides a more detailed description of the form. In this case, the description filed mimics the question field. However, this is not required. The author may include any text in the description field 512 that aids a future user in understanding the purpose of the object. The form type field 514 relates to the appearance of the form to the end user. In this case, the form being created will include radio buttons. However, other appearances, such as drop-down menus and the like are possible. The active field 516 determines which of the possible answers to the question presented in the form will be the default answer. In this case, "yes" will be the default answer. The question field 518 identifies the question that will be asked of the user when the object is encountered during the planning process. In this case, the user will be asked, "Is space available in the existing bay for a new mux?" The option text field 520 includes the possible answers to the question. In this case, the possible answers are "yes" and "no." However, other questions may have additional possible answers. Thus, the Add option button 522 may be used to include additional possible answers. The commit record button 524 causes the information defining the object to be saved. The cancel button 526 aborts the process of creating an object using the form template. In other words, any information entered into the various fields is not saved, and the browser displays a default display screen. The show next button 528 advances to a display screen used to determine the next object in the planning process. The following contextual example will provide greater insight into the workings of this example of the present invention.

The information contained in the data fields in the template area 504 defines a form object that would ask a user in a planning process whether an existing bay has room for a new mux (multiplexer). This object may appear in any planning sequence that requires a new mux and has an existing bay. For example, in a planning sequence, a form object prior to the present form object in the sequence may have asked whether the existing premises equipment includes a bay. Another for object in the sequence (or a number of form objects, together with other objects such as function objects), may have resulted in a determination that a new multiplexer is required (this may have generated a configuration that includes a multiplexer). Having determined that a multiplexer is required, the task remained of determining whether a bay is required for housing and mounting the mux. Thus, the planning sequence would result in the presentation of the form object defined in this example to determine if a new bay is required. If so, the result may be the immediate listing of a configuration for a new bay. Alternatively, the user may be presented with a series of question, each generated by a form object, that ask questions need to properly size a new bay, for example. Many other examples are possible. However, this contextual description of the present example is intended to make such examples apparent to those skilled in the art.

Figure 4:
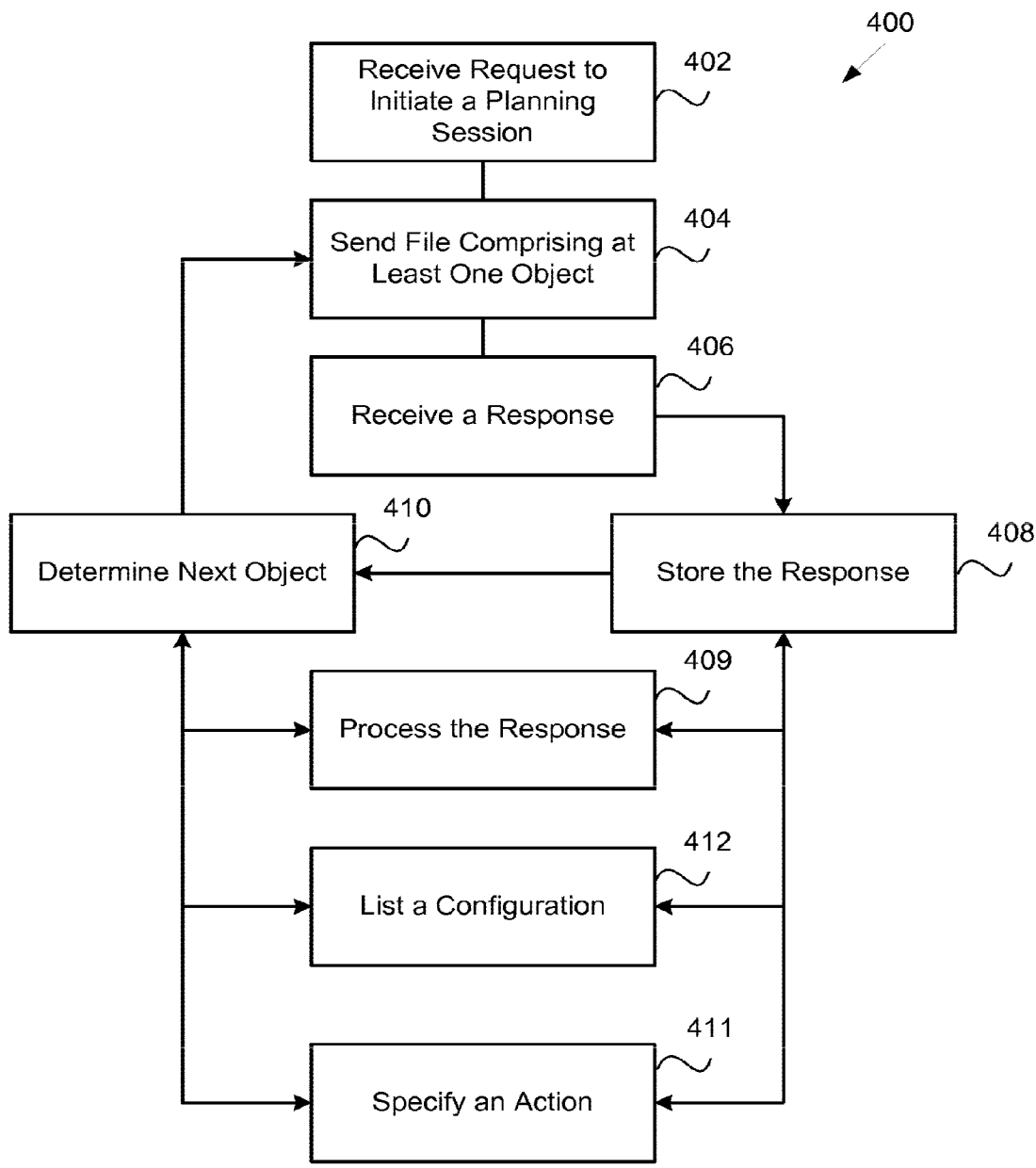
FIG. 4 is a flowchart illustrating a method of using a planning tool according to embodiments of the present invention.

Having described several methods for creating network architecture planning tools according to embodiments of the present invention and a specific example of an embodiment implemented in HTML, attention is now directed to FIG. 4 for a discussion of a method 400 of using a planning tool to create a list of configurations. The method 400 may be implemented in the system 100 of FIG. 1, in which the host computer system 102 interacts with a user computer, such as one of the user computers 108. The user computer 108 may be used by a network planner or engineer creating the specification for a network installation. The method begins at operation 402 when the host computer system receives a request to initiate a planning session. In response to the request, the host computer system transmits a file comprising at least one object to the requesting computer at operation 404. The file may include any of the previously-discusses object types. For example, one object may comprise a question, a second object may include text that describes the question and the possible answers, a third object may include a list of possible answers, a fourth object may identify a conditional link that identifies a subsequent object that depends upon the condition, and so on. Many other examples are possible.

At operation 406, the host computer system receives a response to the first object. The response may comprise, for example, an answer to a question in an object. At operation 408, the host computer system stores the response. If the object that generated the response includes a next object identification, then the host computer system determines the next object at operation 410. However, it may be the case that the response requires processing, as shown at operation 409, specifies an action, as shown at operation 411, or generates a configuration, as indicated by operation 412.

If the response requires processing, the host computer may, for example, evaluate a function included in the object. The function may include information gathered from the user in response to previous objects. The result of the processing may result in a next object, the placement of a configuration, the listing of an action, and the like. Other examples are possible.

If the response causes an action to be specified, the action may be displayed for viewing by the user. Actions may include contacting an individual for more information or to provide information. Actions also may include the placement of one or more configurations. In some embodiments, actions may include an instruction to obtain information from a reference source such as a web site, in which case the URL for the web site may be displayed for the user. Other examples are possible.

If the response results in the placement of a configuration, the host computer system adds the configuration to a configuration list and continues with the process of determining objects and displaying the objects at the user computer. The process may continue until all configurations necessary for the installation are identified and listed.

In some embodiments, the user may terminate the process prior to completion. In some cases, this may generate a partial configuration list for the installation. In other embodiments, no configuration list is generated as a safeguard to ensure completion of the planning process.

If the user terminates the process, the user may reinitiate the process at the point of termination at a later time. In some embodiments, upon reinitiation the host computer system may use the sequence of saved responses to reevaluate the planning process to the point of termination. As a result, any objects that may have changed in the interim to implement new or changed requirements are properly evaluated. If a response in the sequence of saved responses is not a proper response to an object, then the host computer system may prompt the user to reinitiate the process at the point of departure.

In some embodiments, the present invention saves the entire sequence of responses for future reference. FIGS. 6A-B depict an example 600 of a sequence of responses to a planning session, as well as the corresponding configuration list. The example includes a first information block 602 that identifies the architecture tool used to generate the configuration list, the date the tool was created, and the creator of the tool, among other things. The example also includes a second information block 604 that identifies the project for which the planning session was done (the "Architecture Solution"), the date the planning was done, and the individual that did the planning, among other things. The question and answer results section 606 includes each question in the planning process, the answers to the questions, the date the question was answered, and the identity of the person that answered the question. The configurations generated section 608 includes the configuration identification and the quantity of the configuration needed. Other examples of a response sequence and configurations list are possible.

According to embodiments of the present invention, the planning process may be updated subsequent to its completion. For example, if a user, such as a network planner or engineer, uses a planning tool to complete a configuration list for an installation, the sequence of responses is saved, as has been described. However, if the planning tool is subsequently updated to reflect changed requirements, then the user may use the saved sequence of responses to reevaluate the configuration list. The tool may automatically enter responses from the saved list into the sequence of planning steps. If a saved response is out of range for one of the questions in the sequence, then the tool may prompt the user to enter a revised response and continue. It may be the case, depending upon the extend of revisions, that significant portions of the planning process must be reaccomplished. However, if also may be the case that the tool merely updates the configuration list based on the changed requirements. This may be the case, for example, if a particular supplier creates a new version of a configuration, and the new items is substituted in place of the previous item in the planning process. As stated, this would result in a new configuration being written to the list. Otherwise, the planning sequence would remain intact. Having the planning sequence saved has a number of additional, including that it documents compliance with any legally imposed requirements, such as adherence to industry standards in the network planning process.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of creating a planning tool, comprising:
determining a sequence of steps in a planning process relating to a network installation relating to a public switched telephone network, wherein determining a sequence of steps comprises:
assimilating requirements from a plurality of requirements sources, the plurality of requirements sources comprising one or more government regulations;
identifying parameters relating to projects that determine applicable ones of the requirements;
creating at least one step for each parameter that acquires information relating to the parameter; and
ordering the steps so as to acquire parameter information according to a particular sequence;
associating at least one object with each step in the planning process; and
linking the objects according to the sequence;
wherein each object comprises an operation and the operation depends on a location of the step associated with the object in the sequence of steps.

2. The method according to claim 1, wherein the step of associating at least one object with each step in the planning process comprises:
receiving at a user computer a list of objects from a host computer system; and
selecting at least one of the objects from the list to associate with a step.

3. The method according to claim 1, wherein the step of associating at least one object with each step in the planning process comprises:
entering information defining a first object comprising at least a function defining a next object; and
entering information defining at least a second object relating to a network.

4. The method according to claim 3, wherein the information defining at least the second object comprises at least one configuration item related to the network.

5. The method according to claim 3, wherein the information defining at least the second object comprises an action to take related to a network architecture.

6. The method according to claim 5, wherein the action comprises contacting an individual for information relating to the network architecture.

7. The method according to claim 5, wherein the action comprises obtaining educational information relating to the network architecture.

8. The method according to claim 7, wherein the educational information is located on a web site and the information defining the second object comprises a URL for the web site.

9. The method according to claim 5, wherein the task comprises completing a form relating to the network architecture.

10. The method according to claim 1, wherein the step of associating at least one object with each step in the planning process comprises:
receiving at a user computer a list of object templates from a host computer system;
selecting an object template from a list of object templates;
entering information defining an object; and
transmitting the information defining the object to the host computer system.

11. The method according to claim 1, wherein the step of linking the objects according to the sequence comprises:
identifying at least one next object;
defining a condition for each of the at least one next objects; and
transmitting information relating to the at least one next object and the conditions to a host computer system.

12. The method according to claim 1, wherein the requirements sources further comprise a corporate policy.

13. The method according to claim 1, wherein the requirements sources further comprise an industry standard.

14. The method according to claim 1, wherein the requirements sources further comprise a supplier agreement.

15. A system for creating a planning tool, the system comprising:
a host computer system programmed to:
determine a sequence of steps in a planning process relating to a network installation relating to a public switched telephone network, wherein determining a sequence of steps comprises:
assimilating requirements from a plurality of requirements sources, the plurality of requirements sources comprising one or more government regulations;
identifying parameters relating to projects that determine applicable ones of the requirements;
creating at least one step for each parameter that acquires information relating to the parameter; and
ordering the steps so as to acquire parameter information according to a particular sequence;
associate at least one object with each step in the planning process; and
link the objects according to the sequence;
wherein each object comprises an operation and the operation depends on a location of the step associated with the object in the sequence of steps.

* * * * *